E. C. TOWNSEND & AMELIA WASHBURNE.
EGG-POACHING UTENSIL.
No. 186,901. Patented Jan. 30, 1877.
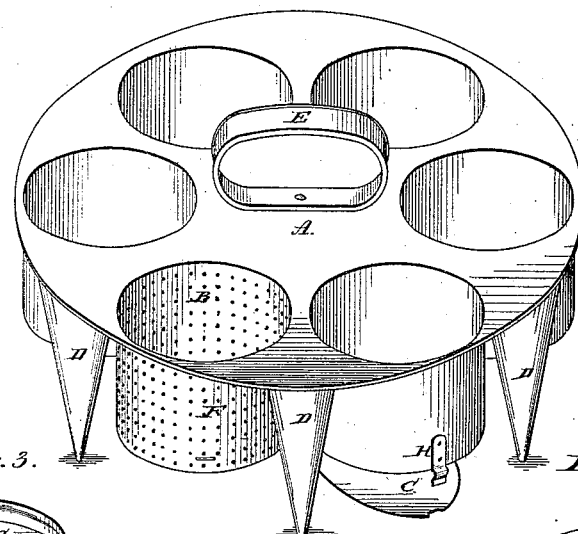
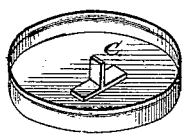
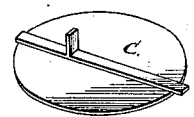
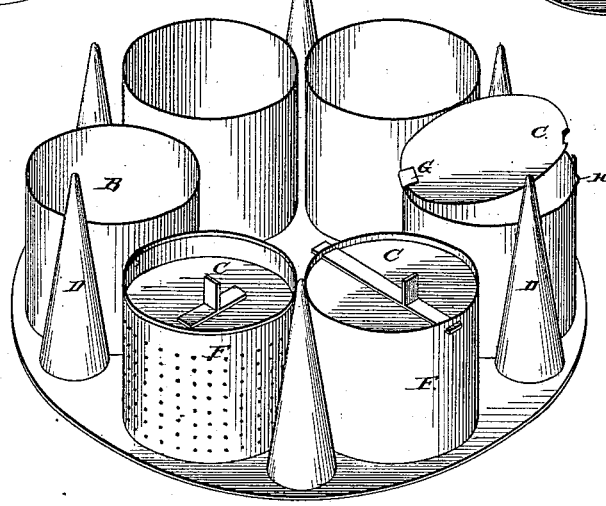
Attest:
Geo. B. Clarke
Jno. Coughlin
Inventors:
Eli C. Townsend
Amelia Washburne

UNITED STATES PATENT OFFICE.

ELI C. TOWNSEND AND AMELIA WASHBURNE, OF NEW YORK, N. Y.

IMPROVEMENT IN EGG-POACHING UTENSILS.

Specification forming part of Letters Patent No. 186,901, dated January 30, 1877; application filed March 10, 1876.

*To all whom it may concern:*

Be it known that we, ELI C. TOWNSEND and AMELIA WASHBURNE, of the city, county, and State of New York, have jointly invented a new and useful Improvement in Egg-Poaching Utensils, which improvement is fully set forth in the following specification, reference being had to the accompanying drawings.

The object of our joint invention is to preserve uniformity in quality and shape of a number of eggs while being poached, facilitate their removal from the water, and render their transfer from the utensil to the table expeditious and cleanly, by the combination, in an egg-poaching utensil, of a series of perforated receptacles, B, made in any form, of tin or other metal, and secured at their tops to openings in a piece of tin, or other metal, A, the receptacles being provided with movable bottoms C. A number of feet, D, support the utensil while partly immersed, the water being allowed to rise near the top of the receptacles. The eggs, being released from their shells and dropped into the boiling water in the receptacles, are thus cooked, when the utensil is taken from the water, and the eggs removed therefrom through the lower ends of their respective receptacles.

We claim as our joint invention—

The combination, in an egg-poaching utensil, of a series of perforated receptacles with the movable bottoms, permitting the removal of their contents through the lower ends of the receptacles, substantially as shown and described.

ELI C. TOWNSEND.
AMELIA WASHBURNE.

Witnesses:
GEO. B. CLARKE,
JNO. D. COUGHLIN.